J. H. HINTON.
Broom Machine.
No. 3,483.
Patented March 13, 1844.
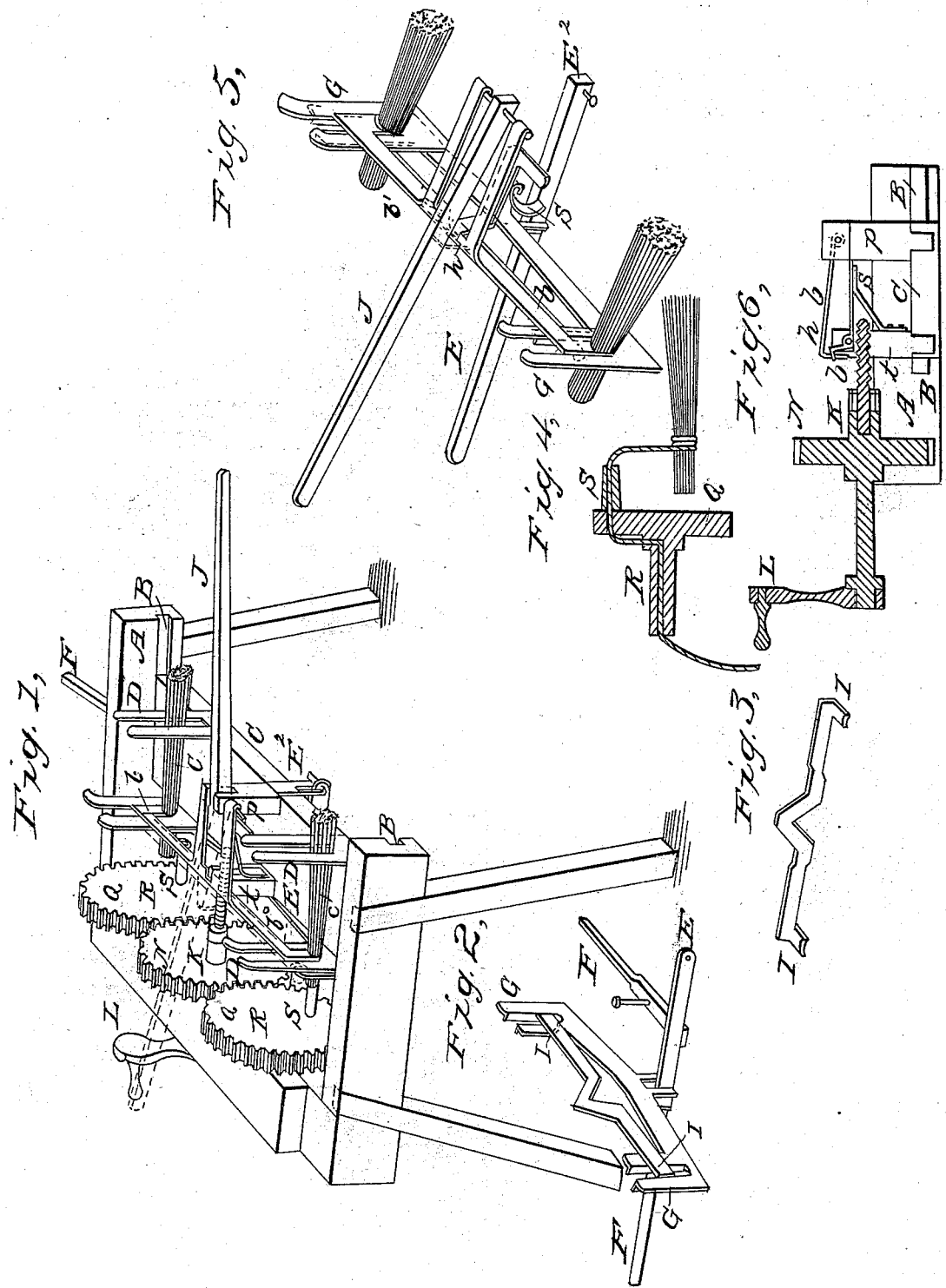

UNITED STATES PATENT OFFICE.

JACOB H. HINTON, OF LANCASTER, PENNSYLVANIA.

MACHINE FOR MAKING BROOMS.

Specification of Letters Patent No. 3,483, dated March, 1844.

*To all whom it may concern:*

Be it known that I, JACOB H. HINTON, of Lancaster, in the county of Lancaster and State of Pennsylvania, have invented a new and useful Machine for Making Brooms, which is described as follows, reference being had to the annexed drawings of the same, making part of this specification.

Figure 1 is a perspective view of the machine, the lever and presser being removed and the rests depressed leaving the brooms held in the boxes ready to be wrapped. Fig. 2 is a perspective view of the concave rests into which the broom corn is pressed detached from the machine. Fig. 3 is a perspective view of the concave pressers for pressing the broom corn into the boxes and concave rests. Fig. 4 is a section of the hollow shaft, and arm attached to the cog wheel for winding or wrapping the twine or wire around the broom. Fig. 5 is a perspective view of the concave rests, presses, boxes, holder and lever detached from the machine and in a position ready for making brooms. Fig. 6 is a vertical section of screw, carriage, brake and spring catch.

A represents the frame or bench made of sufficient size, strength, and material to contain and support the several parts hereafter described and grooved on the inner sides of the end pieces as at B for the tongues on the ends of the carriage C to slide back and forth therein as the carriage with the broom is receded from the wrappers while wrapping the broom.

D D D D are four boxes into which the broom corn is placed and in which it is pressed into a compact body for wrapping by lever power in the manner hereafter described. These boxes are fastened to the carriage in a vertical position in pairs, one opposite the other.

$b$ is a brake hinged to a post $p$ on the carriage C and pressed down upon the broom corn by the lever J and there held by a catch or hook $h$ while the brooms are being tied or wrapped, a spring $s$ keeping said hook in contact. This brake is hinged to a post $p$ mortised and tenoned into the carriage C and is pressed down upon the broom corn in the boxes by the lever J—said brake working against the sides of the boxes next the carriage and when depressed as far as the body of broom corn will permit it is to be secured by the spring catch $h$ attached to the block $t$ of the carriage C, said block also carrying the female screw or nut. The aforesaid spring catch enters a slot in the brake for holding it down.

E is a bar upon which the concave rests are placed and secured, placed under the carriage and secured thereto. $E^2$ being the joint on which it moves.

F is a turning bar attached to the carriage and brought under the bar E for holding it up to its place while pressing the broom corn.

G G are the concave rests into which the broom corn is pressed. These rests are placed below the carriage C their position during the operation of pressing being represented in Figs. 2 and 5. When the pressing operation is finished and the corn is gripped by the brake $b$ the lever F is turned which lets the bar E fall carrying with it the rests O, out of the way so as to allow the wrapping operation to proceed without obstruction.

J is a lever for pressing the concave pressers upon the corn composing the broom. This lever as seen in Fig. 1 is thrown back out of the way. While pressing it is made to assume the position represented in Fig. 5.

K, is a horizontal revolving shaft on which there is a crank L for turning it and a screw. X for moving the carriage and a cog wheel N for turning the wrappers Q Q. The screw works in a nut or female screw in a post or block $t$ fastened to the carriage C and moves the carriage back and forth. Rack and pinion or other mechanical equivalents may be substituted for this screw for moving the carriage.

The revolving wrappers Q Q are cog wheels working into the cog wheel N on the crank shaft K having each a shaft R partly hollow and a hollow arm S inserted into its outer face near the periphery thereof, there being an aperture in the cog wheel corresponding with the aperture through the arm. The twine that is to be wrapped around the broom is carried through the hollow shaft and then through the wheel and arm, and its end being tied around the broom or otherwise secured thereto and the wrappers Q revolved, the arms S will wind the twine around the broom as the carriage carrying the broom is moved by the screw from the said wrappers. The broom corn is first placed in the boxes D and upon the rests G the presser I and brake C are then placed upon the corn and the lever J brought down upon the presser and brake $b$ with sufficient force to press the corn into a compact body suitable for making a good broom and carried down until the spring catch $h$ enters the slot in the brake $b$. The turning bar F is then turned, the jointed bar E with the concave rests let down out of the way and the lever J raised and thrown back and the presser removed so as to leave the compact body of the corn free to be wrapped. One end of the twine is then tied fast around the broom or passed through it and knotted and the crank turned. This causes the cog wheels or wrappers Q and screw X to revolve simultaneously the latter moving the carriage C from the wrappers while the former gradually wind or wrap the twine around the brooms as they recede from the wrappers.

The carriage with the brooms may be stationary in which case the wrappers will have a horizontal as well as rotary movement. The size, proportion and materials of the several parts of the machine may be varied to suit the views of the constructor.

What I claim as my invention and which I desire to secure by Letters Patent is—

1. The combination of the rests or pedestals G, pressers I, brake $b$ for pressing and holding the broom-corn.

2. I also claim the combination of the brake $b$ on the carriage C for holding the broom corn in combination with the wrappers Q as set forth.

JACOB H. HINTON.

Witnesses:
 Wm. T. Elliot,
 Albert E. Johnson.